United States Patent [19]

Suzuki et al.

[11] 4,316,758

[45] Feb. 23, 1982

[54] APPARATUS OF MANUFACTURING PLYWOOD

[75] Inventors: Shunichi Suzuki; Yoshinori Koba; Yoshiaki Yamada; Teruaki Aoto; Yoriyoshi Kuno; Masanobu Yokota, all of Ohbu, Japan

[73] Assignee: Meinan Machinery Works, Inc., Aichi, Japan

[21] Appl. No.: 44,697

[22] Filed: Jun. 1, 1979

Related U.S. Application Data

[62] Division of Ser. No. 910,828, May 30, 1978, abandoned.

[30] Foreign Application Priority Data

Apr. 30, 1976 [JP] Japan ................................ 51-50359

[51] Int. Cl.[3] ...................... B32B 31/00; G05G 15/00

[52] U.S. Cl. .................................. 156/351; 144/317; 156/300; 156/313; 156/358; 156/364; 156/366; 156/563; 271/176; 271/180; 414/35; 414/41; 414/69

[58] Field of Search ............... 156/299, 300, 351, 362, 156/364, 563, 578, 538; 270/59; 271/180, 176; 196/313, 358, 363, 366, 559; 414/35, 41, 69, 904; 144/317

[56] References Cited

U.S. PATENT DOCUMENTS

| | | | |
|---|---|---|---|
| 3,616,090 | 10/1971 | Larson | 156/563 X |
| 3,655,186 | 4/1972 | Bayha | 271/180 |
| 3,671,363 | 6/1972 | Bruder | 270/59 X |
| 3,785,508 | 1/1974 | Hayden | 156/563 |
| 3,909,343 | 9/1975 | Posselt | 156/538 |
| 4,144,112 | 3/1979 | Hasegawa | 156/563 X |

*Primary Examiner*—William A. Powell
*Assistant Examiner*—Thomas Bokan
*Attorney, Agent, or Firm*—Armstrong, Nikaido, Marmelstein & Kubovcik

[57] ABSTRACT

A veneer sheet and an adhesive coated sheet are placed on a piling table. Two vertically arranged conveyors each independently conveys one veneer sheet and stops at predetermined position, pressing member presses two sheets simultaneously vertically downwards onto the piling table where the sheets are placed.

7 Claims, 14 Drawing Figures

FIG. 5
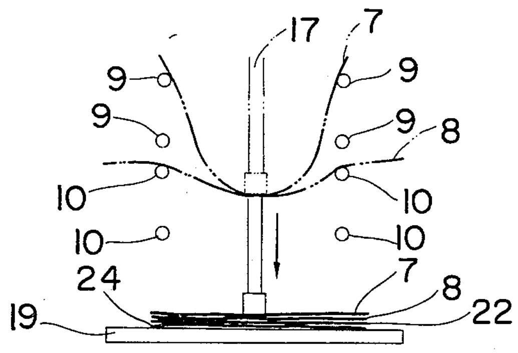
FIG. 6b
FIG. 6a
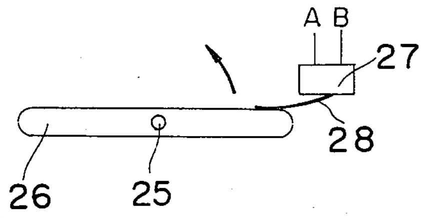
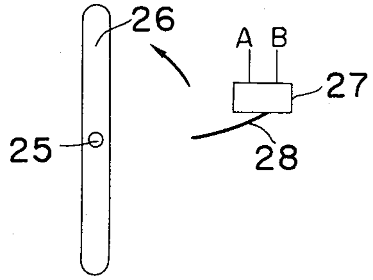
FIG. 7
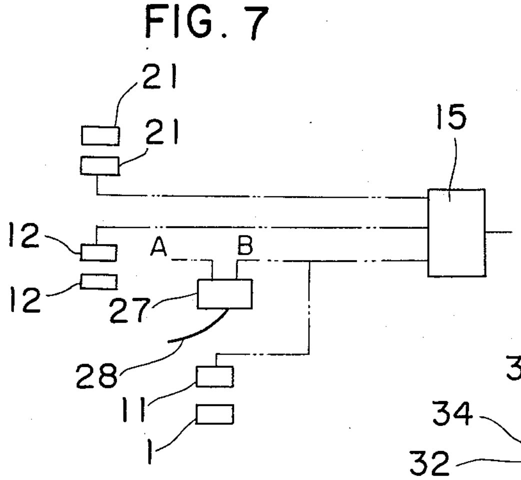
FIG. 8
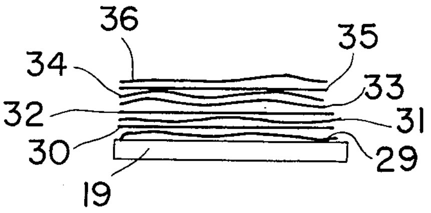

APPARATUS OF MANUFACTURING PLYWOOD

This is a division, of application Ser. No. 910,828, filed May 30, 1978 now abandoned.

BACKGROUND OF THE INVENTION

The present invention relates to a method and an apparatus for manufacturing plywood.

In the plywood manufacturing process, it is important to pile veneer sheets correctly and efficiently, to obtain good yield, quality, and productivity.

Conventionally, two vertically arranged conveyors each supporting a series of veneer sheets are provided. Photoelectric cells detect the front edge of each foremost sheet and stop the conveyors to effect the vertically aligned position of the sheets. Then the conveyors start again, and veneer sheet on the upper conveyor moves along an inclined path to be piled on the sheet on the lower conveyor. However, such a process tends to cause considerable stagger between the piled sheets. Furthermore, a substantially similar process is used to pile adhesive coated sheet. Thus, an accumulation of errors increases loss of material to be trimmed after the sheets are pressed to form plywood.

SUMMARY OF THE INVENTION

A primary object of the present invention is to provide a method and an apparatus of manufacturing plywood by accurately piling up an adhesive coated veneer sheet and two veneer sheets alternately in which one edge of each sheet is aligned with the edge of another sheet.

According to one aspect of the present invention, there is provided a method of manufacturing plywood comprising the steps of:

(a) placing a veneer sheet on a piling table;

(b) placing a veneer sheet which is coated with adhesive on each surface to align one edge of the sheets;

(c) passing two veneer sheets each on one of the two vertically arranged conveyor means each of which supports a veneer sheet at opposite edges thereof;

(d) stopping said two veneer sheets at a predetermined position which is arranged to vertically align with said one edge of the sheet on the piling table;

(e) pressing said two veneer sheets vertically downwards onto said adhesive coated sheet while preventing horizontal displacement of the sheeets when said two sheets both stop at said predetermined position; and (f) repeating the process from (b) to (e).

The veneer sheets which are pressed downwards together form a sandwich of an upper sheet, a middle sheet and a lower sheet, to form three ply plywood. By changing the sequence slightly, a pile of five or seven ply plywood can be easily manufactured.

According to another aspect of the present invention, there is provided an apparatus of manufacturing plywood comprising:

a first conveyor means and a second conveyor means vertically arranged to each other and each conveying a veneer sheet supporting opposite edge portions thereof;

drive means to drive said conveyor means;

a first and a second detecting means each applying first and second output signals when one edge of veneer sheets on said first and second conveyor means arrive at predetermined positions which vertically align with each other;

a first stop means stopping said first conveyor means in response to said first signal of said first detecting means;

a second stop means stopping said second conveyor means in response to said first signal of said second detecting means;

a piling table under said first and second conveyor means;

a spreader means supplying a veneer sheet coated with adhesive on both surface before stacking onto said piling table;

a third detecting means between said spreader means and said piling table detecting the passing of said adhesive coated sheet and applying an output signal;

a three inputs AND circuit receiving said second signals of said first and second detecting means and said output signal of said third detecting means; and pressing actuating in response to output signal of said AND circuit and adapted to press the veneer sheets of said first and second conveyor means simultaneously onto said adhesive coated sheet on said piling table.

According to a further aspect of the invention, there is provided an apparatus of manufacturing plywood comprising:

a first conveyor means and a second conveyor means vertically arranged with each other and each conveying a veneer sheet supporting opposite edge portions thereof;

a first and second drive means to drive said first and second conveyor means;

a first and a second detecting means each applying a signal when one edge of the veneer sheet on said first and second conveyor means arrive at first predetermined positions;

a first stop means attached to the first conveyor means at a second predetermined position on the feed-out side of said first detecting means for stopping said first conveyor means;

a second stop means attached to the second conveyor means on the feed-out side of said second detecting means for stopping said second conveyor means to align one edge of the veneer sheet on the second conveyor means to one edge of the veneer sheet on the first conveyor means;

a piling table under said first and second conveyor means;

a spreader means supplying a veneer sheet coated with adhesive on both surfaces onto said piling table;

a third detecting means between said spreader means and said piling table detecting the passing of said adhesive coated sheet and applying an output signal;

a three input AND circuit receiving said signals of said first and second detecting means and said output signal of said third detecting means; and pressing means actuating in response to an output signal of said AND circuit and adapted to press two veneer sheets on said first and second conveyor means simultaneously downwards on said adhesive coated sheet on said piling table.

BRIEF DESCRIPTION OF THE DRAWINGS

The manner of the foregoing and other objects of this invention will be apparent from the accompanying specification and claims considered together with the drawings, in which:

FIG. 5 shows an end view of a portion of FIG. 4 and showing direction of pressing member movement;

FIGS. 6*a* and 6*b* show operation of a rotatable arm provided to manufacture five ply plywood;

FIG. 7 shows connection of switch shown in FIGS. 6*a* and 6*b*;

FIG. 8 shows piling of sheet to manufacture five ply plywoods;

DETAILED DESCRIPTION

Figure 1:
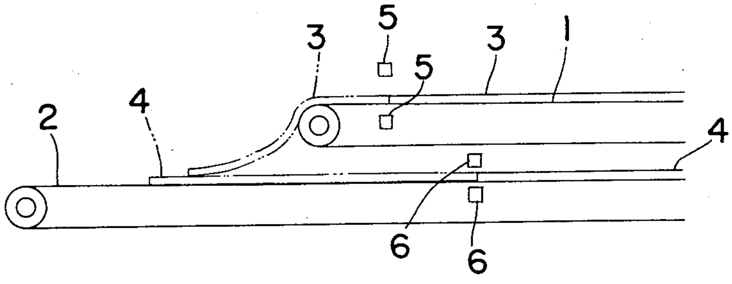
FIG. 1 is a schematic side elevation of a device according to the prior art.

FIG. 1 shows an apparatus for manufacturing plywood according to the conventional technique which comprises two vertically arranged conveyor belts 1 and 2, photoelectric cells 5 and 6 adapted to transmit signals for starting and stopping said conveyor belts. Veneer sheets 3 and 4 are fed by said conveyor belt 1 and conveyor belt 2, respectively, until the photoelectric cells 5 and 6 detect said sheets and the conveyor belts 1 and 2 are stopped in response to the signals from said photoelectric cells 5 and 6, respectively. After being stopped, both belts are then started in unison to feed the veneer sheets 3 and 4 until the sheets are piled as shown by two-dot chain line.

In this method, however, it is often observed that the veneer sheets are piled in a staggered manner by some 50 millimeters of misalignment. This error is due to the difficulty in designing the acceleration and the speed of the conveyor belts 1 and 2 to be of equal value. Therefore, realization of the object of the present invention is impossible in such an apparatus.

Figure 2:
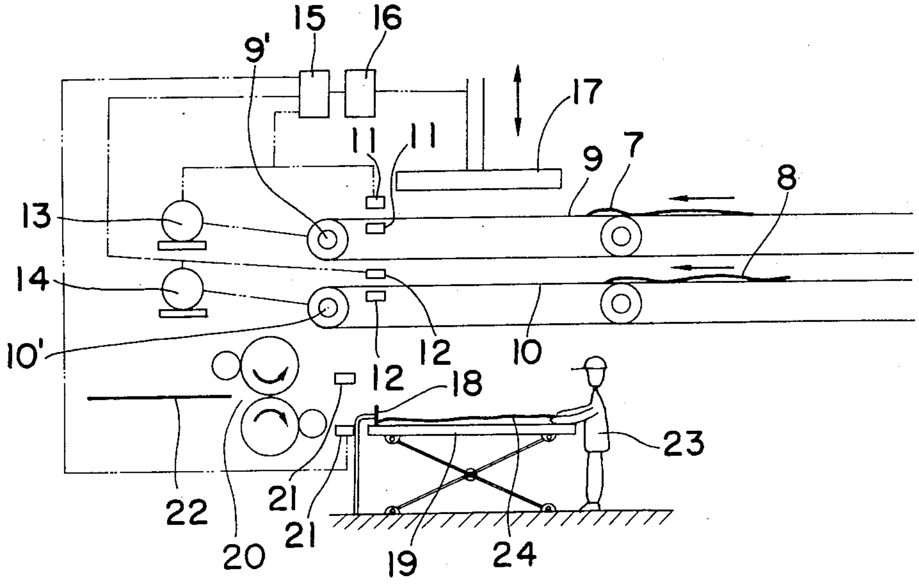
FIG. 2 shows a schematic side elevation of an apparatus of manufacturing plywood, according to the present invention.
Figure 3:
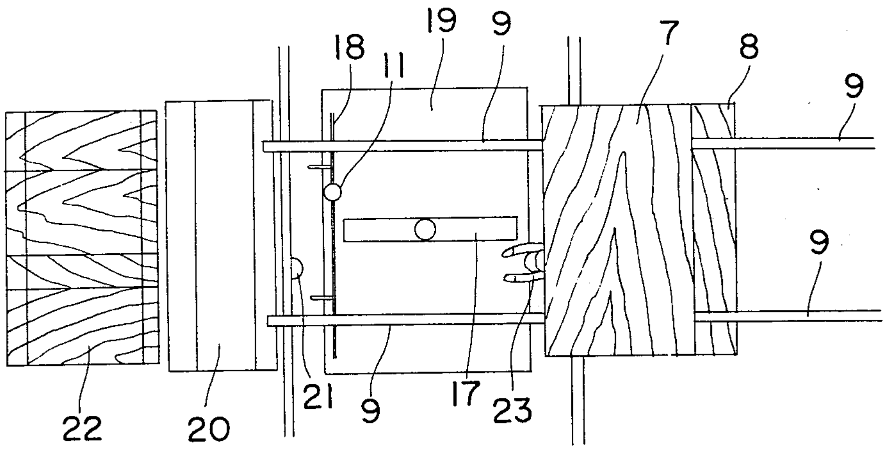
FIG. 3 shows a plan view of a portion of the apparatus shown in FIG. 2.
Figure 4:
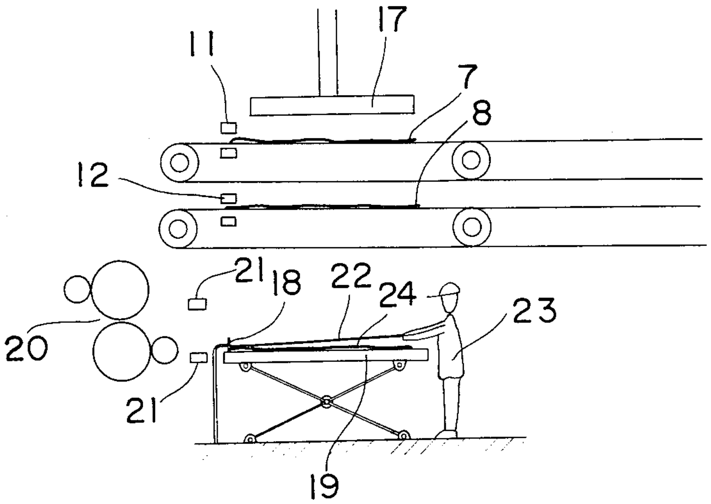
FIG. 4 shows a portion of the apparatus of FIG. 2 and showing veneer sheeets on the conveyor sections before actuation of a pressing member.
Figure 9:
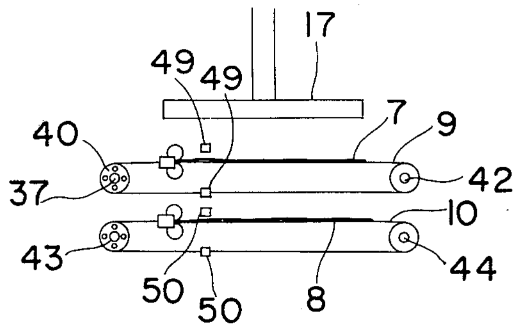
FIG. 9 shows a schematic side elevation of a portion of an apparatus of second embodiment, according to the invention.
Figure 10:
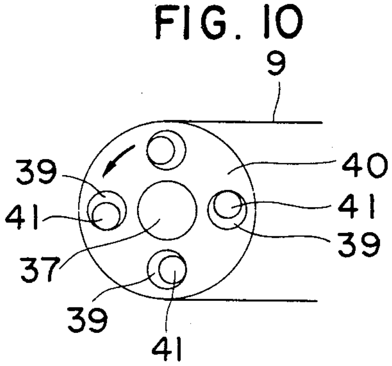
FIGS. 10 and 11 show magnetic clutch shown in FIG. 9.
Figure 11:
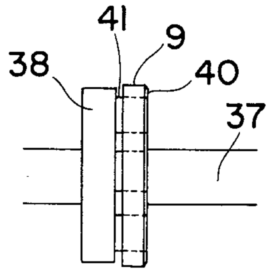

Referring at first to FIGS. 2 and 3 which show schematically plywood manufacturing apparatus according to the present invention the vertically arranged spaced first and second conveyor sections are connected respectively with feeding conveyors and driven by respective drive pulleys which are driven by a motor not shown.

The feeding conveyors feed respective veneer sheets 7 and 8 to conveyor belts 9 and 10 of the conveyor sections. As shown in FIG. 3, the conveyor belts 9 and 10 are formed as parallel and spaced belts to support both edge portions of the veneer sheets 7 and 8 in their respective horizontal planes.

Near each of the drive pulleys of the conveyor sections, vertically aligned photoelectric cells 11 and 12 are arranged. The photoelectric cells 11 and 12 detect the presence of the veneer sheets 7 and 8 respectively and control the stop and start of the conveyor sections. Thus the moment the veneer sheet 7 disturbs the light beam of the photoelectric cell 11, the output signal of the cell 11 transmits a signal to a clutch brake 13 between the drive pulley and the motor. When the signal is not applied, the clutch brake 13 acts as a clutch and transmits driving power of the motor to the drive pulley. Similarly the moment the photoelectric cell 12 detects the presence of the veneer sheet 8, the output signal of the cell 12 causes the clutch brake 14 to operate which is connected between the drive pulley and the motor. Thus, the conveyor sections stop independently when the veneer sheets 7 and 8 reach predetermined positions, regardless of fore or aft relative position of the veneer sheets 7 and 8 while proceeding on the conveyor sections. When the veneer sheets 7 and 8 are both stationary, the sheets 7 and 8 are in vertically aligned relation.

Under the conveyor section, a sheets piling table 19 is provided. The table 19 can be vertically and periodically adjusted according to piled height of the sheets. Adjacent to or on the table 19, a vertical aligning plate 18 from which an imaginary vertical line extends at right angles to the conveyor belts 9 and 10 aligns vertically with the photoelectric cells 11 and 12. Veneer sheet 24 is placed manually such that its one end is aligned to said plate 18. To the front of piling table 19, adhesive coating spreader 20 is provided to coat adhesive to both surfaces of a middle veneer sheet 22 which is supplied from a third conveyor section which is not shown. The middle veneer sheet 22 can be supplied manually if desired. The speed of the spreader 20 or the distance between the vertical plate 18 and the spreader 20 is selected to drop the middle sheet 22 beyond the vertical plate 18. Third photoelectric cell 21 is provided at the outlet of the spreader to detect the middle veneer sheet 22 which is fed on the table 19. The middle veneer sheet 22 which is fed onto the piling table 19 may be aligned by operator 23 who pushes the sheet 22 against the plate 18.

Vertically above the stationary veneer sheets conveyor section, pneumatically operable pressing member 17 is arranged. As shown in FIG. 3, the pressing member 17 is an elongated plate to press the center line portions of the veneer sheets 7 and 8 at a high speed. As will be described referring to FIG. 5, the pressing member 17 flexes the veneer sheets 7 and 8 from the conveyor belts 9 and 10 and thereby sandwiching middle veneer sheet 22 on the table 19 between said veneer sheet 24 and veneer sheet 8.

To control the operation of the pressing member 17, a control apparatus applies an actuation signal to a pneumatic cylinder connected with the pressing member 17. Thus, output signals from the photoelectric cells 11, 12 and 21 are applied to first, second and third input terminals of a three inputs AND circuit 15 which applies an actuation signal when the three input terminals all receive the output signals of the photoelectric cells, to a timer 16 which actuates the pneumatic cylinder after a predetermined time lag. The actuation of the third conveyor section is initiated after the veneer sheets 7 and 8 are pushed on the table 19 by the pressing member 17.

In operation, one veneer sheet 24 is at first placed on the piling table 19 by the operator 23 such that its one edge is in alignment with aligning plate 18. Then the third conveyor section is actuated to feed the middle veneer sheet 22 through the spreader 20. The sheet 22 is coated with adhesive on both surfaces and is placed on the table 19 on the sheet 24. While passing of the sheet 22 between the spreader 20 and the table 19, the photoelectric cell 21 applied an output signal to the third input terminal of the AND circuit 15. When sheet 22 is placed on sheet 24, one end of sheet 22 is manually aligned to aligning plate 18.

The first and second conveyor sections convey the veneer sheets 7 and 8. When the veneer sheet 7 reached the photoelectric cell 11, the cell 11 transmits two first signals. One of the two first signals of the cell 11 is applied to the clutch brake 13 to stop the conveyor section 1. The other first signal is applied to the first input terminal of the AND circuit 15. When the veneer sheet 8 reaches the photoelectric cell 12, the cell 12 also transmits two second signals. One of the two second signals of the cell 12 is applied to the clutch brake 14 to stop conveyor section 2 and the other second signal is applied to the second input terminal of the AND circuit 15. Thus, the first and second conveyor sections are stopped, and the veneer sheets 7 and 8 are stopped in vertically aligned relation in association with the aligning plate 18.

When the three input terminals of the AND circuit 15 receive the output signals from the photoelectric cells 11, 12 and 21, an output signal from the AND circuit 15 is applied through the timer 16 to the pneumatic cylinder of the pressing member 17, to actuate the pressing member 17 after a predetermined time lag. FIG. 3 shows relative positions of the veneer sheets 7, 8 and 22 just before actuation of the pressing member 17.

Actuation of the pressing member 17 is shown in FIG. 5. When the pressing member 17 pushes the veneer sheet 7 downwards, the member 17 urges the center line portion of the sheet 7 downwards to flex the sheet 7 between the spaced conveyor belts 9 which support opposite edge portions of the sheet 7. Then, the sheet 7 contacts with the sheet 8 and both sheets 7 and 8 are pushed downwards by the pressing member 17 until the sheet are pressed down onto the middle sheet 22 on the piling table 19. Meanwhile, friction between the sheet 7 and the member 17 prevents horizontal displacement of the sheet 7, and friction between the sheets 7 and 8 prevents horizontal displacement of the sheet 8. Thus, the veneer sheets 7 and 8 are pressed on the table 19 in precisely aligned relative position at their front edges.

After the pressing operation, the pressing member 17 returns to its original uppermost position, and the first, second and third conveyors sections are started to feed veneer sheets 7, 8 and 22. As no holding means is applied to the third conveyor section, the adhesive coated middle veneer sheet 22 is aligned manually on the table 19. Thus, the abovementioned process is repeated.

On the table 19, piled up sheets form 3 ply plywood, each formed by cover sheets 7 and 8 and adhesive coated middle sheet 22.

Next, 5 ply plywood are made by the apparatus shown in the FIGS. 2 and 3. To this end means shown in FIGS. *6a* and *6b* is added to the circuit shown in FIG. 2.

As shown in FIG. *6a*, a rotatable arm 26 is fixed with a rotatable shaft 25 rotatably supported by any appropriate portion of the apparatus and adapted to operate a contacter 28 of a microswitch 27, when the arm 26 is a horizontal position which is an initial position. The shaft 25 is connected with the pressing member 17 by means not shown to rotate the shaft 90° at every downward movement of the member 17. When the arm 26 contacts with the contacter 28 input and output terminals A and B of the microswitch 27 are opened, and the terminals A and B are closed when the contacter 28 is released from the arm 26 as shown in FIG. *6b*.

The connection of the microswitch 27 is shown in FIG. 7. As shown, the microswitch 27 is, when closed, adapted to apply a false input signal to the first input terminal of the AND circuit 15 and is branched off from the first input terminal of the AND circuit 15 and connected parallel with the output circuit of the photoelectric cell 11.

To manufacture 5 ply plywood, first, a cover veneer sheet 29 is placed on the table 19 and its one end is manually aligned to aligning plate 18. The arm 26 is positioned as shown in FIG. *6b* to apply output signal to the first input terminal of the AND circuit 15. Next, the third conveyor section is actuated to feed adhesive coated veneer sheet 30 on the sheet 29 on the table 19. One end of said sheet 30 is manually aligned to aligning plate 18. The photoelectric cell 21 applied an output signal to the AND circuit 15. Also the second conveyor section is actuated to feed center veneer sheet 31. When the sheet 31 reaches the photoelectric cell 12, the second conveyor section and the sheet 31 are stopped as before and an output signal is applied to the AND circuit 15. Thus, three input terminals of the AND circuit initiate the circuit to apply an output signal to actuate the pressing member 17 since arm 26 takes the position as shown in FIG. *6b* to apply a false signal to the first input terminal of AND circuit 15. Thus the pressing member 17 presses only one sheet 31 onto the table 19 at a high speed, and turns the arm 26 as shown in FIG. 6.

Then, all conveyor sections are actuated to feed veneer sheets 34, 33 and 32 respectively. As described before, the adhesive coated sheet 32 is placed on the sheet 31 on the table 19 at first, and the photoelectric cell applies an output signal to the AND circuit 15. When the veneer sheets 34 and 33 arrive at the photoelectric cells 11 and 12 respectively, the first and second conveyor sections and the sheets 34 and 33 are stopped as before, and output signals are applied to the AND circuit 15. When the last output signal is received by the AND circuit 15, the pressing member 17 is actuated after a time lag, and two sheets 34 and 33 are urged onto the adhesive coated sheet 32 on the table 19. The pressing member 17 again moves the arm 26 to turn 90° as shown in FIG. *6b*.

The process is repeated; i.e. an adhesive coated veneer sheet 35 from the spreader 20, and center core veneer sheet 36 from the second conveyor section, are sequentially piled on the table 19. Thus, five plies are piled on the table 19.

That is to say, arm 26 which takes first a horizontal position as shown in FIG. *6a* to open input and output terminals A and B of the microswitch 27, next, takes another horizontal position after a pivotal movement of 180° to again open said terminals A and B. In the case of manufacture of five-ply plywood, arm 26 takes this position after two pivotal movements of 90° to open said input and output terminals A and B such that AND circuit 15 operates when supply is detected of three veneer sheets including one adhesive-coated veneer sheet from the third conveyor section and two veneer sheets from the first and second conveyor sections. During this pivotal movement of 180°, input and output terminals A and B are closed once, i.e. when arm 26 takes the vertical positions as shown in FIG. *6b* with the result that AND circuit 15 operates when supply is detected of only two veneer sheets including one adhesive-coated veneer sheet from the third conveyor section and one veneer sheet from the second conveyor section since the first input terminal of AND circuit 15 is applied with a false signal as a result of the closure of the terminals A and B of microswitch 27.

However, if this 180° pivotal movement of arm 26 is designed to be completed after three pivotal movements of 60°, the actuation of the pressing means can be initiated twice by the detection of the supply of only two sheets including one adhesive-coated veneer sheet from the third conveyor section and one veneer sheet from the second conveyor section. Therefore, it is possible to manufacture plywood of seven plies by arranging shaft 25 and arm 26 to make three pivotal movements of 60° each at every actuation of pressing member 17 during the completion of a 180° pivotal movement.

Similarly, it is further possible to manufacture plywood of nine, eleven, thirteen or more plies by arranging shaft 25 and arm 26 to make four 45°, five 36°, six 30°, etc. pivotal movements each at every actuation of pressing member 17. In this way, plywood of any selected number of plies can be manufactured by the apparatus according to the present invention.

The height of the table 19 is regulated as the pile of the sheets is accumulated. When the pile reaches the desired height, the pile is removed from the table and is pressed to form the desired plywood sheets.

A second embodiment of the present invention is shown in FIGS. 9–12. In place of the clutch brakes 13 and 14 shown in FIG. 2, clutch and sheet stopper means are provided. In the embodiment shon in FIGS. 10 and 11, one of the drive pulleys to drive conveyor belts 9 of the first conveyor section acts as a magnetic clutch. A belt drive pulley 40 rotatably connected with a drive shaft 37 faces with a flange 38 rigidly connected with the shaft 37. The drive pulley 40 forms recesses 39 in which magnets 41 are inserted. The pulley 40 and the flange 38 normally form integral drive connection. However, when an excessive load is applied to conveyor belt 9, the pulley 40 is released from the flange 38, and the first conveyor section moves only by inertia force. Also the second conveyor section forms a similar magnetic clutch.

Figure 12:
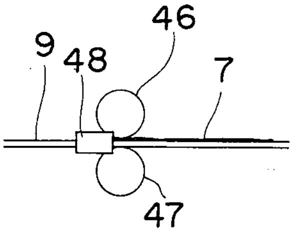
FIG. 12 shows stopper shown in FIG. 9.
Figure 13:
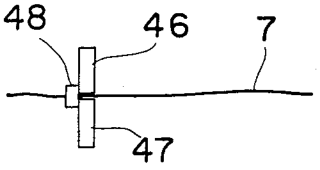
FIG. 13 shows another view of the stoppeer means.

Stopper means to stop the veneer sheets 7 and 8 is shown in FIG. 12, and formed by opposed small free running rollers 46 and 47 and a stopper 48 adjacent to the rollers. The rollers 46 and 47 are narrow rollers and arranged adjacent each conveyor belts 9. The rollers 46 and 47 guide the front edges of the veneer sheet.

The stopper 48 engages with the front edge of the veneer sheet, and stops the same sliding on the moving conveyor belts 9 and 10.

As the front edge of the veneer sheet 7 or 8 reaches the stopper means, the rollers 46 and 47 guide the front edge between them. The stopper 48 stops the sheet 7 or 8 and the first and second conveyor section stops by frictional force between the sheet 7 or 8 and the conveyor belts 9 or 10. As both stoppers 48 are vertically aligned with vertical plate 18 on piling table 19, the sheets 7 and 8 stop in precisely aligned position, when both sheets are stopped by the stoppers 48. The actuation of the pressing member 17 is similar to the embodiment shon in FIGS. 2–5. Illustratively, immediately before reaching the stopper 48, the veneer sheets 7 and 8 disturb and light beams from photoelectric cells 49 and 50 which are provided in the immediate vicinity of and upstream of said stopper 48 vertically aligned with aligning plate 18. As a result, said photoelectric cells 49 and 50 transmit signals, respectively, to the first and second input terminals of a three inputs AND circuit as shown in the embodiment of FIG. 2. Said AND circuit further receives a signal from a photoelectric cell similar to the photoelectric cell 21 in the foregoing embodiment. Then, the pressing member 17 is actuated in response to the output signal from said AND circuit after a predetermined time lag created by a timer provided to the circuit.

In the embodiment shown in FIG. 2, the leading ends of moving sheets 7 and 8 are designed to be detected by photoelectric cells 11 and 12 above vertical plate 18 provided on the left end portion of the table 19 and stopped by the operation of clutch brakes 13 and 14. However, said vertical plate 18 may be provided on the right end portion of the table 19. In this modification, photoelectric cells are arranged in vertical alignment with the thus provided vertical plate 18 so that trailing ends of the sheets 7 and 8 are detected for stopping their movement by the operation of clutch brakes 13 and 14.

It will be appreciated that two independently moving veneer sheets stop at predetermined vertically aligned positions, and after the two sheets are aligned pressing means pushes the sheets vertically down on a piling table without causing horizontal displacement of the sheets. Thus, one edge of each sheet is aligned on the piling table. Thus edge cutting operation to the finished plywoods is simplified and yield of material is greatly improved.

Further, as the two sheets are simultaneously placed on the piling table, production rate is also improved. As the sheets are piled on one vertically adjustable piling table, apparatus is simple and easy in operation.

What is claimed is:

1. An apparatus for manufacturing plywood comprising a horizontal support surface defined at a predetermined position to pile veneer sheets thereon for manufacturing plywood in succession;

- means for supplying a veneer sheet coated with adhesive on both surfaces thereof to place on a veneer sheet on said support surface;
- first and second conveyor means disposed above said predetermined position in respective upper and lower horizontal planes vertically arranged with each other, and each having a pair of parallel conveyor belts spaced apart from each other in a horizontal plane and conveying a veneer sheet thereon;
- pressing means provided above said first conveyor means for pressing the veneer sheet from at least one of said first and second conveyor means vertically between said two pairs of conveyor belts down to the adhesivecoated veneer sheet supplied on said support surface;
- first and second detecting means provided in association with said respective first and second conveyor for detecting one end of the veneer sheet on each conveyor belt upon its reaching said predetermined position;
- third detecting means provided in the vicinity of said means for supplying said adhesive-coated sheet for detecting a supply of an adhesive-coated sheet on said support surface, said first, second, and third detecting means providing first, second, and third signals for the operation of said pressing means, respectively;
- a three input AND circuit provided between said pressing means and said first, second, and third detecting means, said circuit having first, second, and third input terminals for receiving said first, second, and third signals respectively, and adapted to apply an output signal to operate said pressing means;

a false signal circuit branched off from one of said first and second input terminals;

switch means inserted in said false signal circuit; and actuating means provided in association with said pressing means for bringing said switch means into ON or OFF state.

2. An apparatus according to claim 1, wherein said actuating means includes a shaft rotatably attached to the apparatus; an arm having a center portion rigidly connected to said shaft at said center portion, and said arm keeping said switch means in an open state in an initial position; and means operatively connected with said pressing means for rotating said shaft and said arm through a stepwise angular movement upon each actuation of said pressing means.

3. An apparatus according to claim 2, wherein each stepwise angular movement is 90 degrees.

4. An apparatus according to claim 2, wherein each stepwise angular movement is 60 degrees.

5. An apparatus according to claim 2, wherein each stepwise angular movement is 45 degrees.

6. An apparatus according to claim 2, wherein each stepwise angular movement is 36 degrees.

7. An apparatus according to claim 2, wherein each stepwise angular movement is 30 degrees.

* * * * *